United States Patent
Allen et al.

(10) Patent No.: US 9,940,395 B2
(45) Date of Patent: Apr. 10, 2018

(54) INFLUENCE BUSINESS BENEFIT FROM USER REVIEWS AND COGNITIVE DISSONANCE

(71) Applicant: International Business Machines Corporation, Armonk, NY (US)

(72) Inventors: Corville O. Allen, Morrisville, NC (US); Joseph N. Kozhaya, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 14/540,442

(22) Filed: Nov. 13, 2014

(65) Prior Publication Data
US 2016/0140239 A1   May 19, 2016

(51) Int. Cl.
*G06F 17/30* (2006.01)

(52) U.S. Cl.
CPC .... *G06F 17/30867* (2013.01); *G06F 17/3043* (2013.01); *G06F 17/3053* (2013.01); *G06F 17/3097* (2013.01)

(58) Field of Classification Search
CPC ........................ G06F 17/3053; G06F 17/30867
See application file for complete search history.

(56) References Cited

U.S. PATENT DOCUMENTS

| | | | |
|---|---|---|---|
| 7,558,769 B2 | 7/2009 | Scott et al. | |
| 8,515,828 B1 | 8/2013 | Wolf et al. | |
| 9,342,846 B2 | 5/2016 | Maddali et al. | |
| 9,396,490 B1* | 7/2016 | Marx | G06Q 30/0282 |
| 9,621,662 B1 | 4/2017 | Mukherji | |
| 2009/0248602 A1 | 10/2009 | Frazier | |
| 2011/0010308 A1 | 1/2011 | Primus et al. | |
| 2012/0005114 A1 | 1/2012 | Bank et al. | |
| 2013/0006881 A1 | 1/2013 | Klemm | |
| 2013/0117329 A1 | 5/2013 | Bank et al. | |
| 2013/0144802 A1 | 6/2013 | Bank et al. | |
| 2013/0218884 A1 | 8/2013 | McConnell et al. | |
| 2013/0297619 A1* | 11/2013 | Chandrasekaran | G06Q 10/10 707/748 |
| 2014/0214548 A1 | 7/2014 | Faltings et al. | |
| 2015/0248721 A1* | 9/2015 | Brown | G06Q 30/0631 705/26.7 |
| 2015/0262264 A1 | 9/2015 | Appel et al. | |

OTHER PUBLICATIONS

Tsytsarau et al., "Scalable Detection of Sentiment-Based Contradictions," DiversiWeb 2011: First International Workshop on Knowledge Diversity on the Web, in conjunction with WWW 2011, Mar. 28, 2011, Hyderabad, India, 8 pages.

Allen et al., "Influence Personal Benefit from Dynamic User Modeling Matching with Natural Language Statements in Reviews," U.S. Appl. No. 14/540,487, filed Nov. 13, 2014, 43 pages.

* cited by examiner

Primary Examiner — Kris E Mackes
(74) Attorney, Agent, or Firm — VanLeeuwen & VanLeeuwen; Diana R. Gerhardt

(57) ABSTRACT

An approach is provided in which a knowledge manager identifies first opinion phrases included in a first review that the knowledge manager displays on a display. The knowledge manager locates contradictory reviews that include second opinion phrases that contradict the first opinion phrases and, in turn, displays the contradictory reviews on the display.

14 Claims, 11 Drawing Sheets

INFLUENCE BUSINESS BENEFIT FROM USER REVIEWS AND COGNITIVE DISSONANCE

BACKGROUND

Consumer purchasing decisions have grown in sophistication over the years due to technological advancements. In the past, a consumer would travel to a store and review an item in person before buying the item. Consumers today purchase an enormous amount of items online over computer networks such as the Internet. However, a drawback to purchasing items online is that the consumer does not have the luxury of evaluating the item in person to determine the item's quality, features, and overall "look and feel." As such, the consumer turns to online item reviews written by other consumers and item review specialists to guide their purchasing decisions, which also includes service-oriented items such as restaurants, events, activities, etc. In short, online reviews play a powerful role during a consumer's purchasing decisions.

Many times an online review system may show an item review that is negatively biased. The negative bias may be in the form of a "low star rating" or may include details such as "the food was bad." Unfortunately, the consumer may not research other online reviews to gain a more knowledgeable understanding of the item and, in turn, may not purchase an item or visit an establishment based upon the negatively biased item review.

BRIEF SUMMARY

According to one embodiment of the present disclosure, an approach is provided in which a knowledge manager identifies first opinion phrases included in a first review that the knowledge manager displays on a display. The knowledge manager locates contradictory reviews that include second opinion phrases that contradict the first opinion phrases and, in turn, displays the contradictory reviews on the display.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
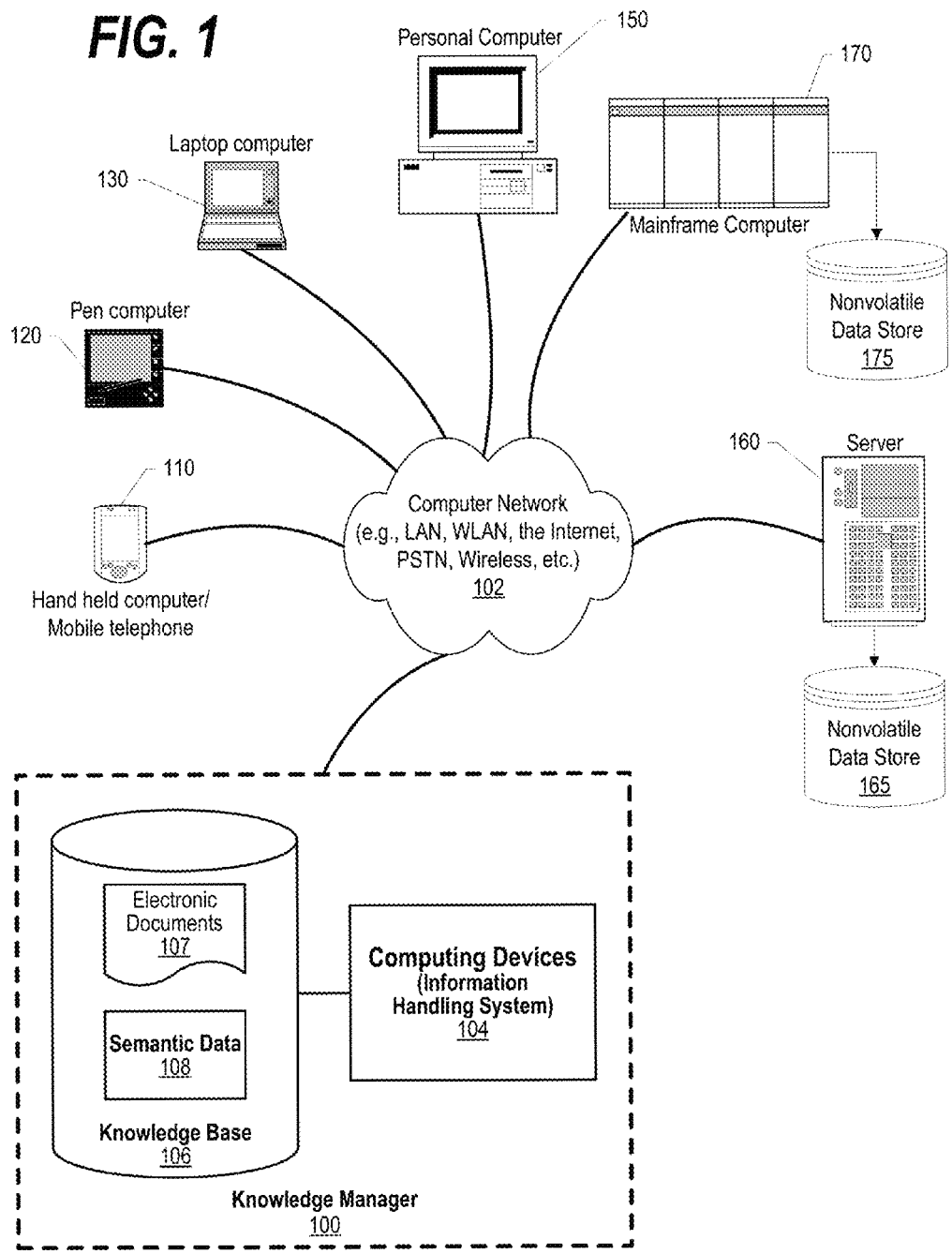
FIG. 1 depicts a schematic diagram of one illustrative embodiment of a knowledge manager system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
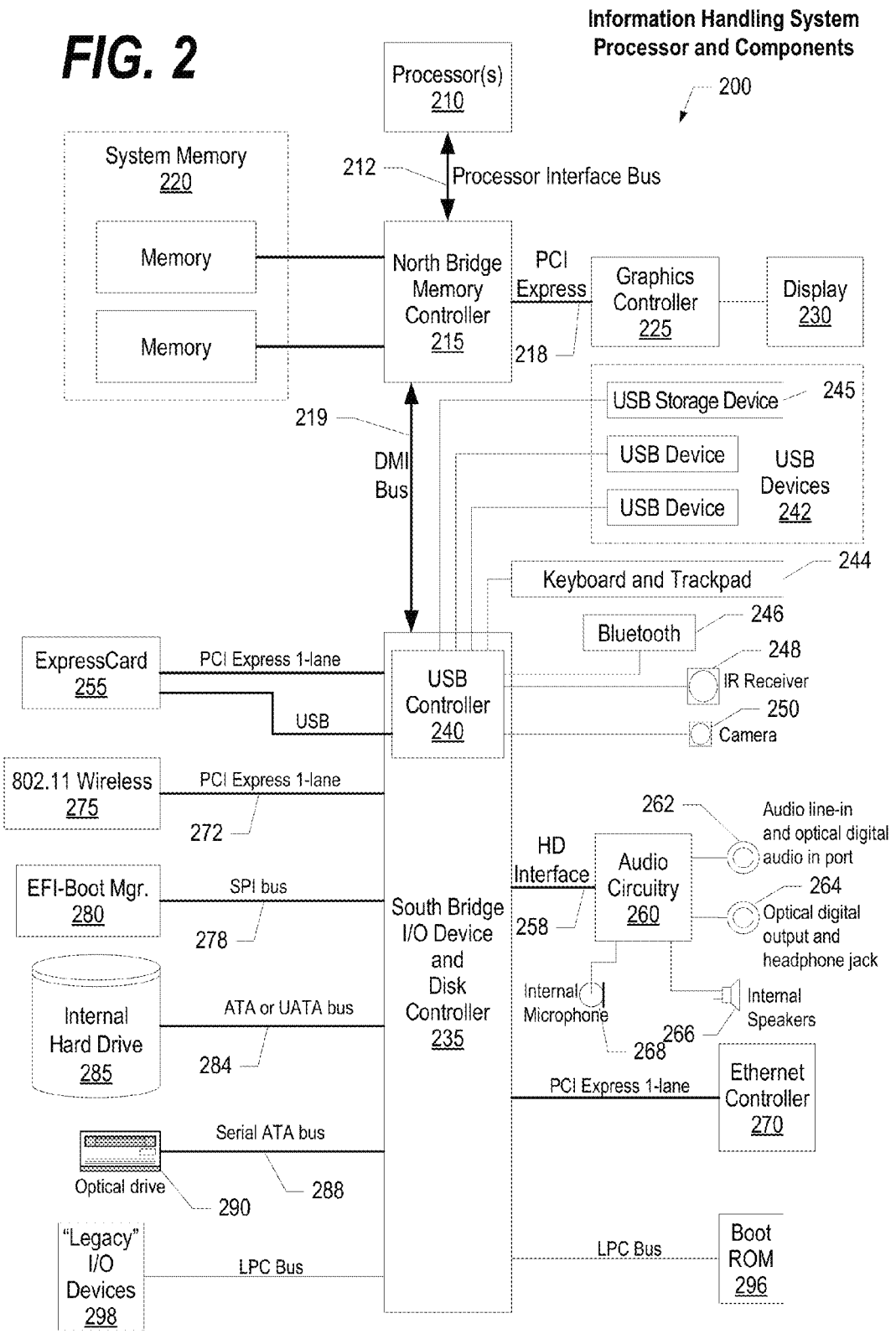
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-11 depict an approach that can be executed on an information handling system. The information handling system analyzes a negative item review and identifies negative opinion phrases in the negative review. In one embodiment, the information handling system receives a user selection of a negative review and commences the negative item review process accordingly. The knowledge manager locates contradictory reviews of the same item that include positive opinion phrases contradicting the negative opinion phrases. In one embodiment, the positive opinion phrases are general in nature such as "the restaurant was nice" and in another embodiment the positive opinion phrases are specific in nature such as "the chicken was fresh." In turn, the knowledge manager displays the contradictory positive reviews to a user.

Figure 3:
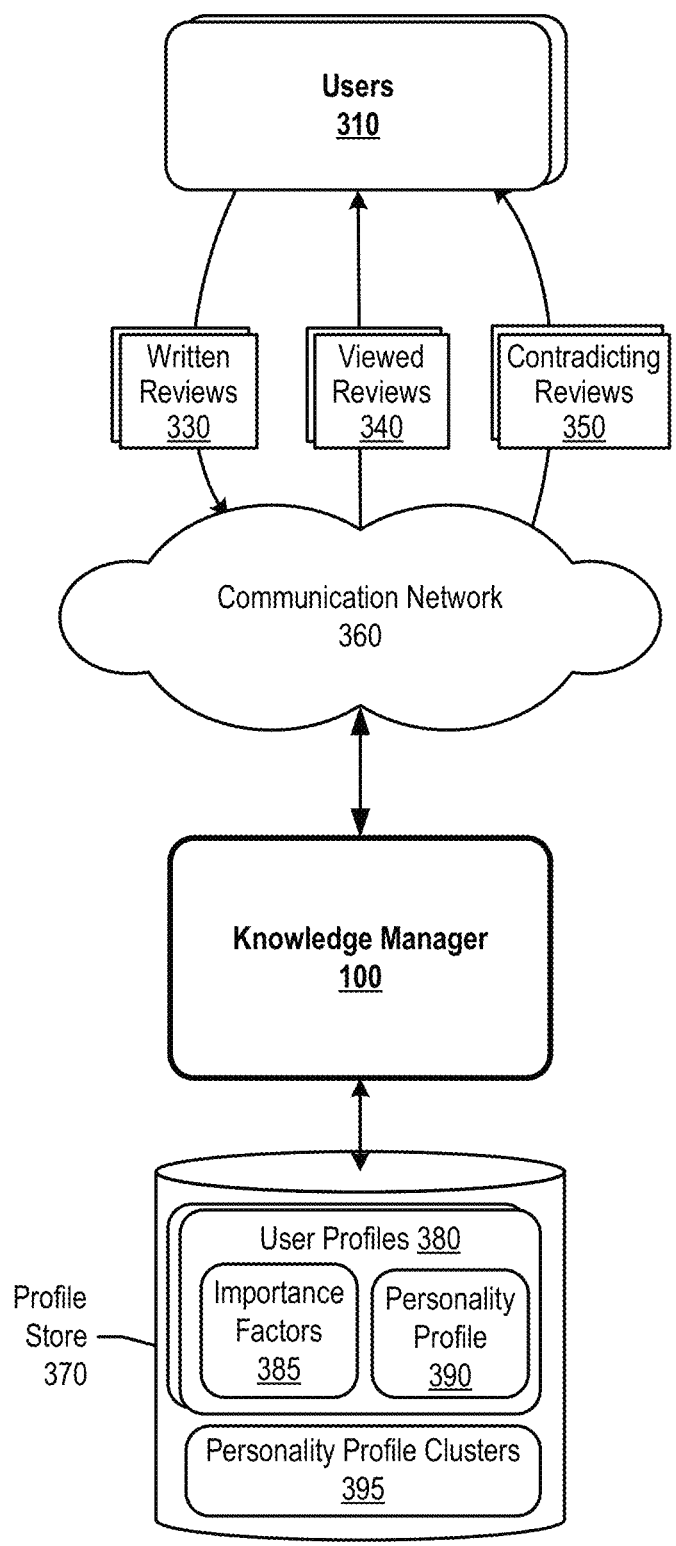
FIG. 3 is an exemplary diagram depicting a knowledge manager providing reviews to users based upon factors such as opinion phrases in the reviews, user importance factors, and personality profiles.

FIG. 3 is an exemplary diagram depicting a knowledge manager providing reviews to users based upon factors such as positive opinion phrases in the reviews, user item importance factors, and personality profiles. In one embodiment, knowledge manager 100 is a stand-alone, third party system that supports item review web sites. In another embodiment, an item review web site includes knowledge manager 100 to provide targeted reviews to a user.

Knowledge manager 100 monitors item reviews via communication network 360. When a user selects a negative item review to view (viewed reviews 340), knowledge manager 100 displays positive reviews that contradict the negative review (contradicting reviews 350). In one embodiment, knowledge manager 100 locates negative opinion phrases in the negative review and locates positive reviews that include contradictory positive opinion phrases. For example, a negative review may include a negative opinion phrase such as "the food was stale" and knowledge manager 100 may locate a positive review that includes a positive opinion phrase of "the food was fresh." As discussed herein, an item may be a product, a service, or a combination of a product and service offered to a consumer (e.g., a restaurant).

In one embodiment, knowledge manager 100 creates user profiles 380 corresponding to users 310. In this embodiment, knowledge manager 100 analyzes written reviews 330 written by users 310 to determine each of the user's importance factors 385. For example, knowledge manager 100 may determine that one of users 310's importance factors is "quality" because the user typically writes reviews about an item's quality. In another embodiment, knowledge manager 100 may access a user's social media sites to determine a user's importance factors by analyzing, for example, the user's discussion topics. Knowledge manager 100, in turn, may display item reviews based upon the user's importance factors. For example, if a user's importance factor is quality, knowledge manager 100 displays reviews pertaining to an item's quality at the top of the list instead of reviews pertaining to ambiance, price, delivery times, etc.

Knowledge manager 100 may also analyze a user's written reviews and social media sites to determine a user's personality traits and assign a personality profile 390. In one embodiment, knowledge manager 100 categorizes users 310 into a personality profile categorized by the psychology community, which are openness, conscientiousness, extraversion, agreeableness, and neuroticism (OCEAN) (see FIGS. 4, 9, and corresponding text for further details). In turn, knowledge manager 100 provides reviews to requesting users written by other users with similar personality profiles, which may be more relatable to the requesting user (see FIGS. 5, 10, 11, and corresponding text for further details).

Figure 4:
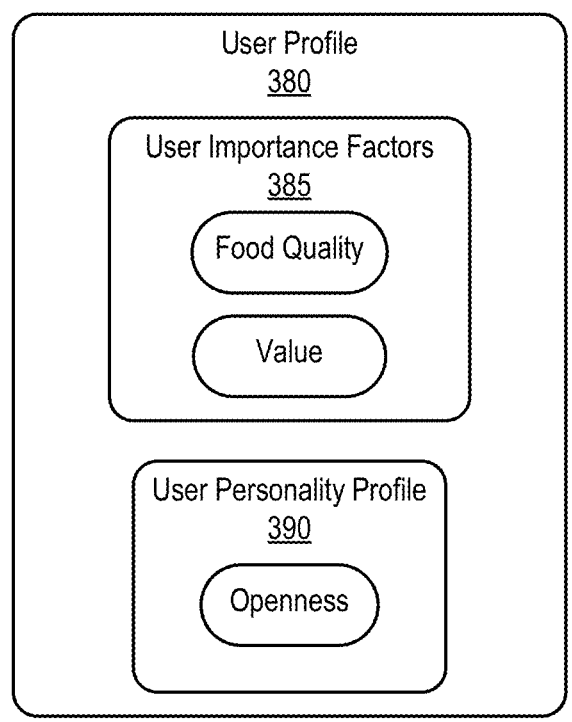
FIG. 4 is an exemplary diagram depicting a user profile.

FIG. 4 is an exemplary diagram depicting a user profile. In one embodiment, user profile 380 includes user importance factors 385 and user personality profile 390 corresponding to the user. Knowledge manager 100 analyzes reviews written by a user to determine the user's importance factors. For example, knowledge manager 100 may perform deep semantic analysis on a user's reviews and determine that 90% of the user's restaurant reviews include information pertaining to the quality of the food and the price of the food. In this example, knowledge manager 100 determines that the user's importance factors are food quality and value.

In another example, knowledge manager 100 may determine that a different user's reviews discussed ambiance of restaurants and, in this example, knowledge manager 100 determines that ambiance is an importance factor of the different user. As such, knowledge manager 100 filters or sorts reviews based upon user importance factors 385 instead of having the user page through numerous reviews that include information (e.g., wait times) that aren't important to the user (see FIG. 10 and corresponding text for further details).

Regarding user personality profile 390, knowledge manager 100, in one embodiment, analyzes the user's reviews and may access the user's social media sites to gain an insight as to the user's personality. Knowledge manager 100 uses linguistic analytics to extract a spectrum of cognitive and social characteristics from the text data that a person generates through reviews, text messages, tweets, posts, etc. In one embodiment, knowledge manager 100 may adhere to five personality traits categorized by the psychology community, which are five broad domains or dimensions of personality that describe human personality. The "five-factor model" includes openness, conscientiousness, extraversion, agreeableness, and neuroticism (OCEAN).

The five factor model accounts for different traits in personality to classify a user into a personality profile. In one embodiment, each of the five broad domains corresponds to sub-traits and, based upon their percentages, knowledge manager 100 determines a user's personality profile. For example, assuming knowledge manager determined the following sub-traits and percentages based upon the user modeling analysis: Adventurousness (72%), Artistic interests (19%), Emotionality (2%), Imagination (93%), Intellect (94%), Authority-challenging (93%), knowledge manager determines that the user has a 94% personality profile of "openness."

Figure 5:
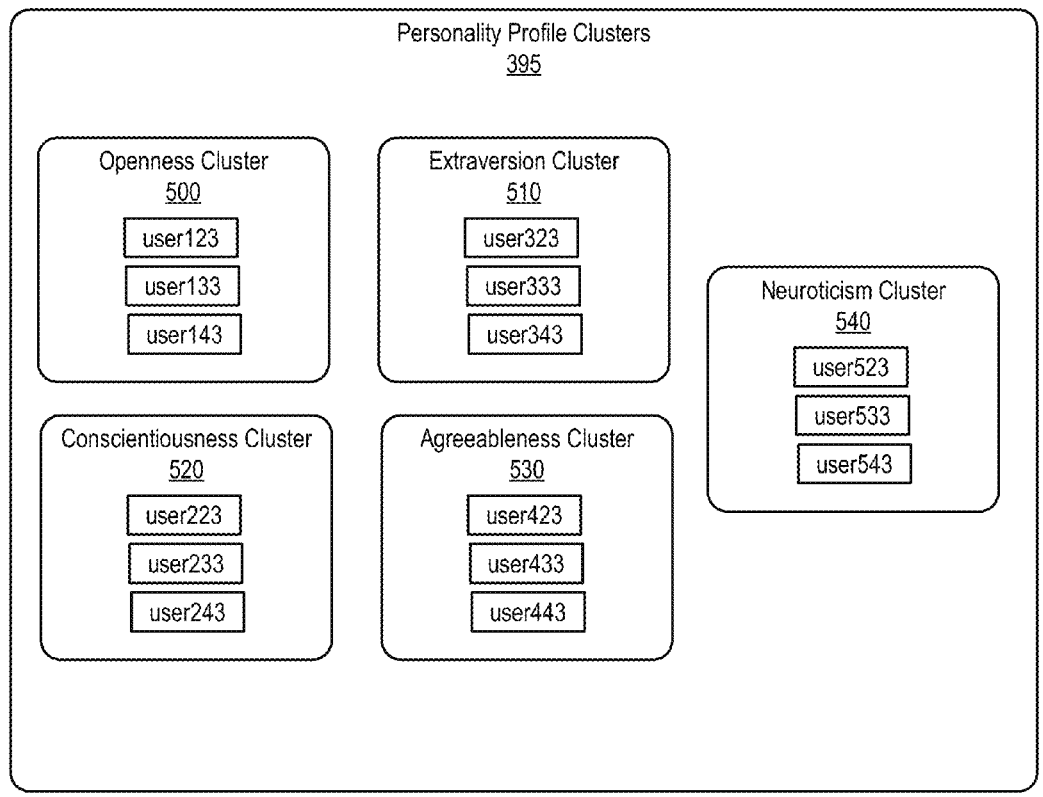
FIG. 5 is an exemplary diagram depicting user identifiers grouped into personality profile clusters.

When knowledge manager 100 performs modeling analysis on the user's reviews and social media sites, knowledge manager 100 classifies, in one embodiment, the user into one of the personality profiles and clusters the users accordingly (see FIG. 5 and corresponding text for further details). As a result, knowledge manager 100 provides reviews to a requesting user written by other consumers with a similar personality profile, which may be more meaningful and resonate with the requesting user.

FIG. 5 is an exemplary diagram depicting user identifiers grouped into personality profile clusters. In one embodiment, knowledge manager 100 manages personality profile clusters 395, which groups users according to their determined personality profile. When knowledge manager 100 classifies a personality profile of a user, knowledge manager 100 adds the user's identifier to the corresponding personality profile cluster and stores the personality profile in the user's profile.

FIG. 5 shows personality profile clusters based upon a five factor model discussed above. Openness cluster 500 includes user identifiers of users classified as having an openness personality. Extraversion cluster 510 includes user identifiers of users classified as having an extraverted personality. Conscientiousness cluster 520 includes user identifiers of users classified as having a conscientious personality. Agreeableness cluster 530 includes user identifiers of users classified as having an agreeable personality. Finally, neuroticism cluster 540 includes user identifiers of users classified as having a neurotic personality. Knowledge manager 100 uses personality profile clusters 395 to sort and display reviews to a user written by other users having a similar personality.

Figure 6:
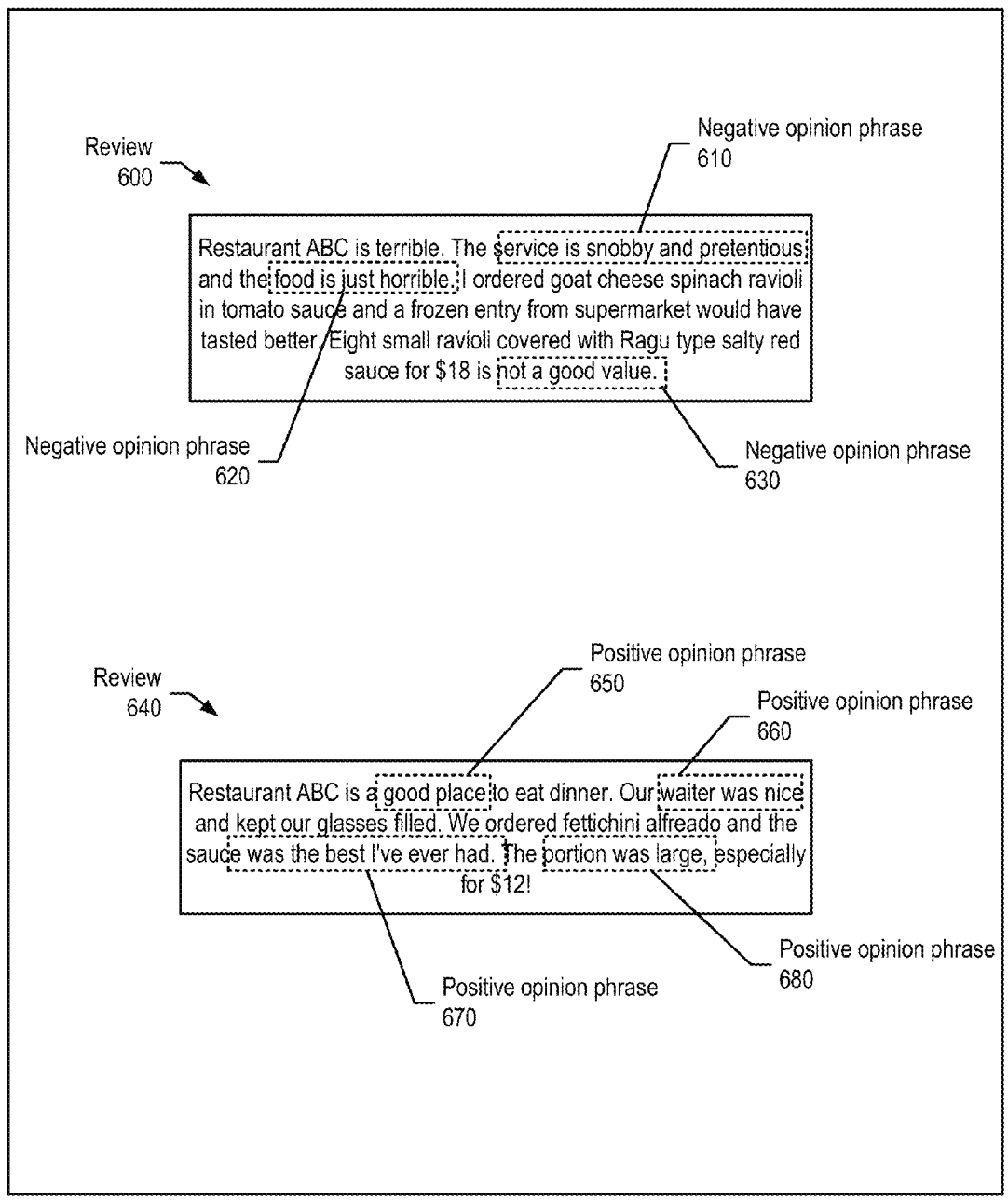
FIG. 6 is an exemplary diagram depicting a negative review and a contradictory review.

FIG. 6 is an exemplary diagram depicting a negative review and a contradictory positive review. Knowledge manager 100 detects that a user is viewing review 600, which includes negative opinion phrases 610, 620, and 630. Knowledge manager 100 searches for reviews of the same item that include contradicting phrases and identifies contradicting review 640. Contradicting review 640 includes positive opinion phrases 650, 660, 670, and 680, which contradict the negative opinion phrases in review 660.

In one embodiment, knowledge manager 100 may identify multiple contradicting reviews that each contradicts portions of a negative review. Using review 600 as an example that includes negative opinion phrases pertaining to service, food, and value, knowledge manager 100 may locate a first contradicting review that discusses good service, a second contradicting review that discusses good food, and a third contradicting review that discusses good value. In this embodiment, knowledge manager 100 displays each of the located contradicting reviews, and may even sort the reviews based upon the user's importance factors (see FIGS. 8, 10, 11, and corresponding text for further details).

Figure 7:
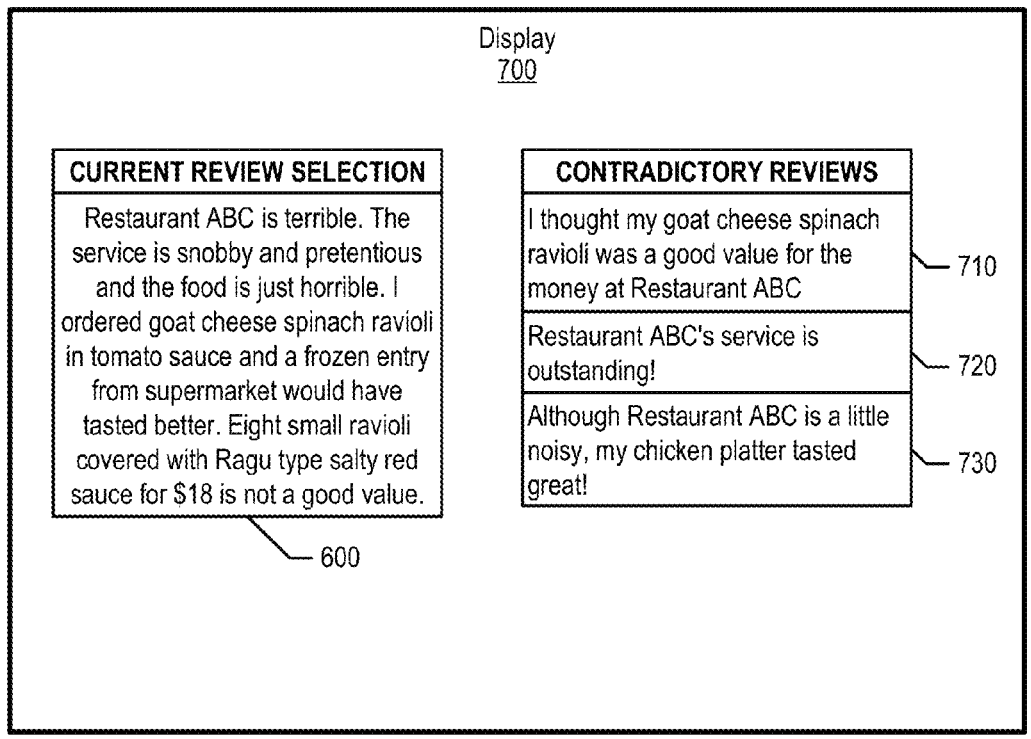
FIG. 7 is an exemplary diagram depicting a user selected review and contradicting reviews displayed on a display.

FIG. 7 is an exemplary diagram depicting a user selected review and contradicting reviews displayed on a display. A user selected review 600, which is a negative review about Restaurant ABC and includes several negative biased phrases. Knowledge manager 100 searches other reviews about Restaurant ABC and identifies contradicting reviews, which include positive opinion phrases. In one embodiment, knowledge manager 100 identifies reviews that include positive opinion phrases that directly contradict a negative opinion phrase. For example, a negative opinion phrase may be "the chicken was horrible" and a directly contradicting positive opinion phrase may be "the chicken was great." In another embodiment, knowledge manager 100 may identify general positive opinion phrases such as "the food was great."

Knowledge manager 100 displays the contradicting reviews 710, 720, and 730 in a particular order on display 700, such as based upon the user's importance factors. For example, knowledge manager 100 may determine that the user's highest importance factor is value and, therefore, knowledge manager 100 displays review 710 at the top of the list that discusses the good value of the food. In another embodiment, knowledge manager 100 may display both positive and negative reviews based upon the user's importance factors (see FIG. 10 and corresponding text for further details). In yet another embodiment, knowledge manager may display reviews written by users with a similar personality (see FIG. 11 and corresponding text for further details).

Figure 8:
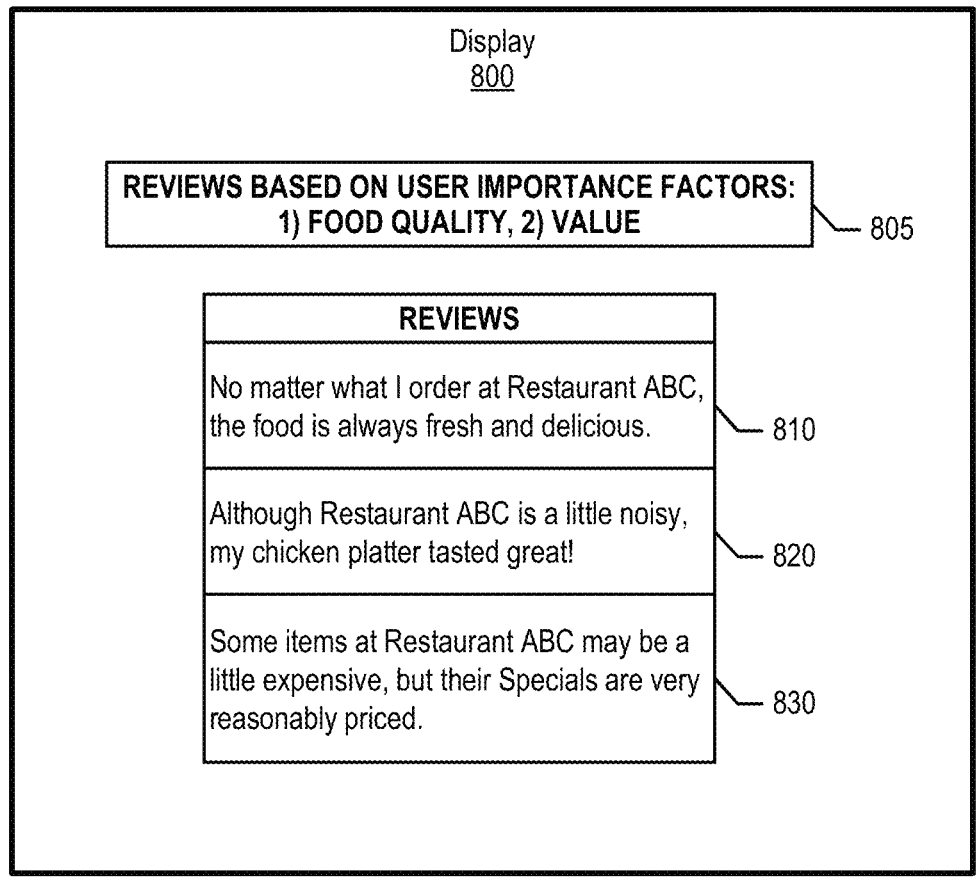
FIG. 8 is an exemplary diagram depicting user reviews based upon a user's importance factors.

FIG. 8 is an exemplary diagram depicting user reviews based upon a user's importance factors. Knowledge manager 100, in one embodiment, searches reviews based upon a user's importance factors and displays (or filters) the matching reviews at the top of a list. Display 800 shows that the user's importance factors are food quality and value (text box 805). As such, knowledge manager 100 displays reviews 810, 820, and 830 at the top of the list that discusses a restaurant's food quality.

In one embodiment, knowledge manager 100 may display both positive reviews and negative reviews pertaining to a user's importance factors to provide the user with an overall objective viewpoint.

Figure 9:
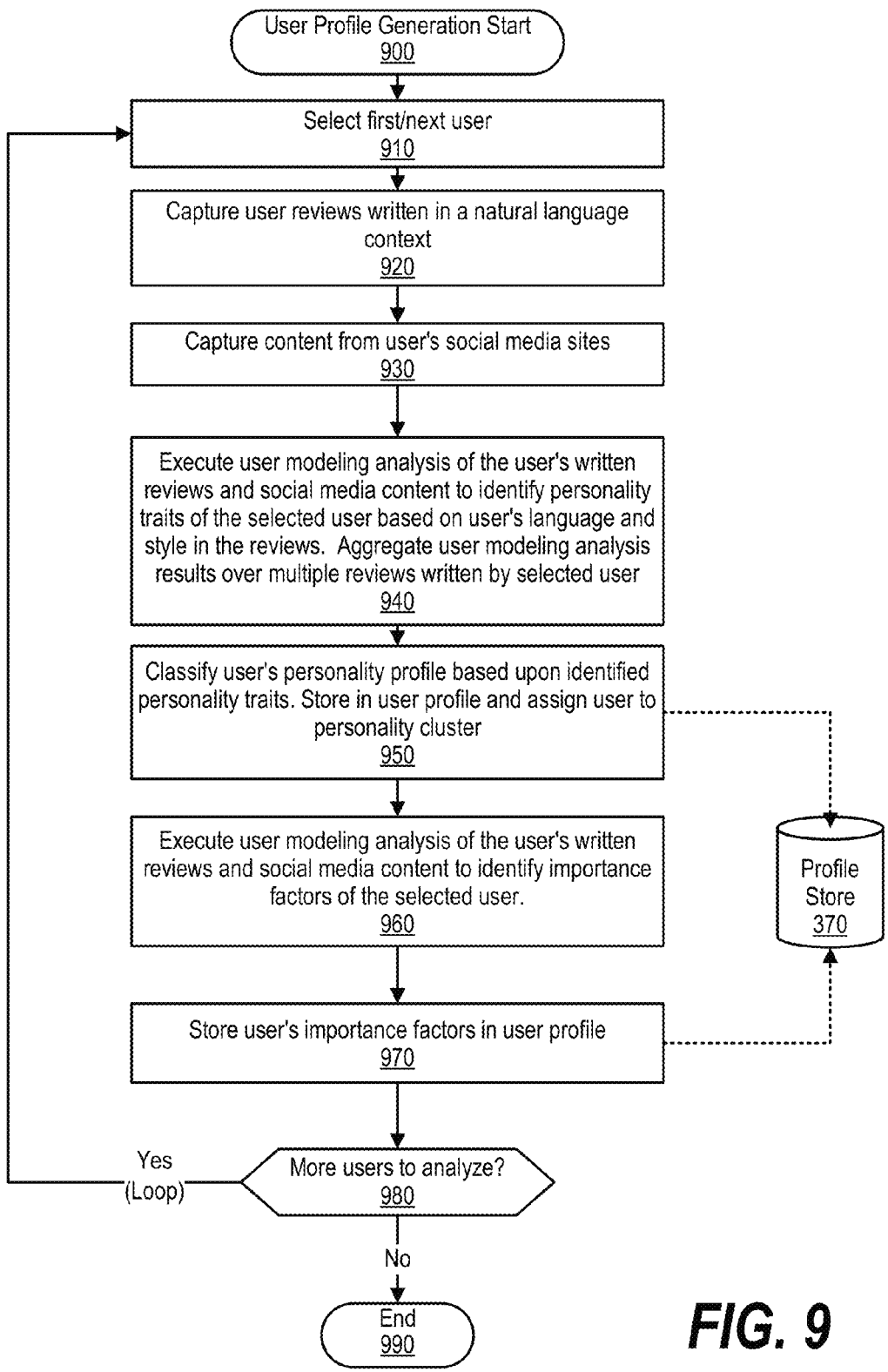
FIG. 9 is an exemplary flowchart depicting steps by a knowledge manager to generate user profiles that include user personality information and user importance factors.

FIG. 9 is an exemplary flowchart depicting steps by a knowledge manager to generate user profiles that include user personality information and user importance factors. Processing commences at 900, whereupon the process selects a first user at step 910. The first user may be, for example, an existing user of a review website, or may be a new user to the review website that is creating a user account.

At step 920, the process captures user reviews written in a natural language context by the user. For example, the user may have written reviews about restaurants, electronic items, excursions, etc. At step 930, the process captures content from the user's social media sites if available, such as discussion topic information, likes, dislikes, etc.

At step 940, the process executes a user modeling analysis of the user's historical reviews previously written by the user and social media content to identify personality traits of the selected user based on user's language and style in the reviews as discussed herein. For example, if a user writes, "I prefer a foyer that is open with enough lounge chairs to increase the chances of meeting someone new", the process assigns a high score for agreeableness and extraversion to the user.

The process aggregates the user modeling analysis results over multiple reviews written by the user and, at step 950, the process classifies the user's personality profile based upon identified personality traits. In one embodiment, the process categorizes the user into one of five personality traits categorized by the psychology community, which are openness, conscientiousness, extraversion, agreeableness, and neuroticism. The process stores the user's personality profile in the user profile and stores the user's identifier in a corresponding personality profile cluster (see FIG. 5 and corresponding text for further details).

At step 960, the process executes a user modeling analysis of the user's historical reviews and social media content to identify the importance factors of the selected user, such as whether on time delivery is more important than item price. In one embodiment, the process uses the modeling analysis performed in step 940 to identify the user's importance factors.

Figure 11:
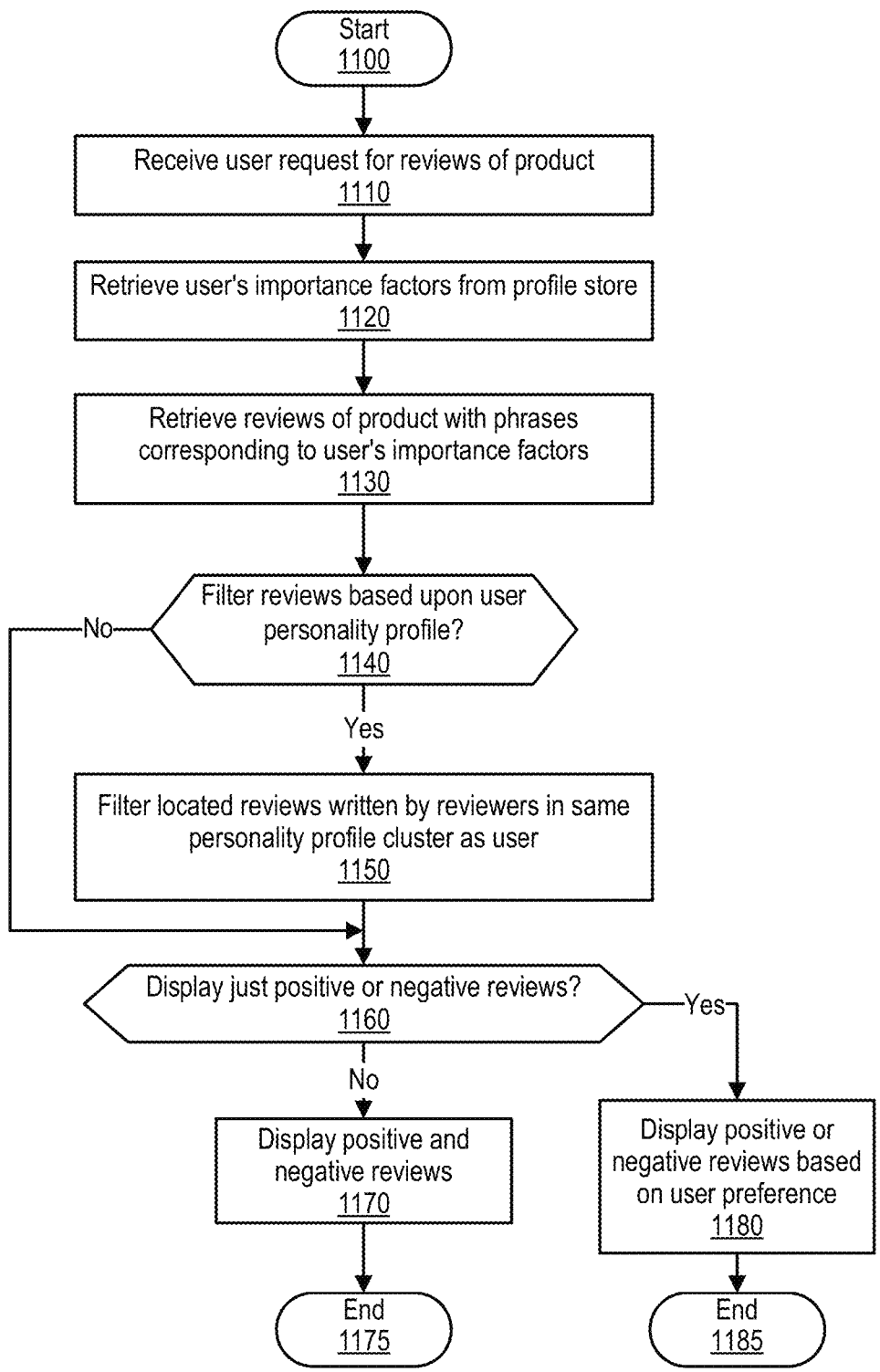
FIG. 11 is an exemplary flowchart depicting steps by a knowledge manager to provide item reviews to a user based upon the user's importance factors.

At step 970, the process stores the user's importance factors in a user profile, which allows the process to sort and display item reviews based upon the user's importance factors (see FIG. 11 and corresponding text for further details). The process determines as to whether there are more users to analyze (decision 980). If there are more users to analyze, then decision 980 branches to the 'yes' branch, which loops back to select and process the next user. This looping continues until there are no more users to create a user profile, at which point decision 980 branches to the 'no' branch. FIG. 9 processing thereafter ends at 990.

Figure 10:
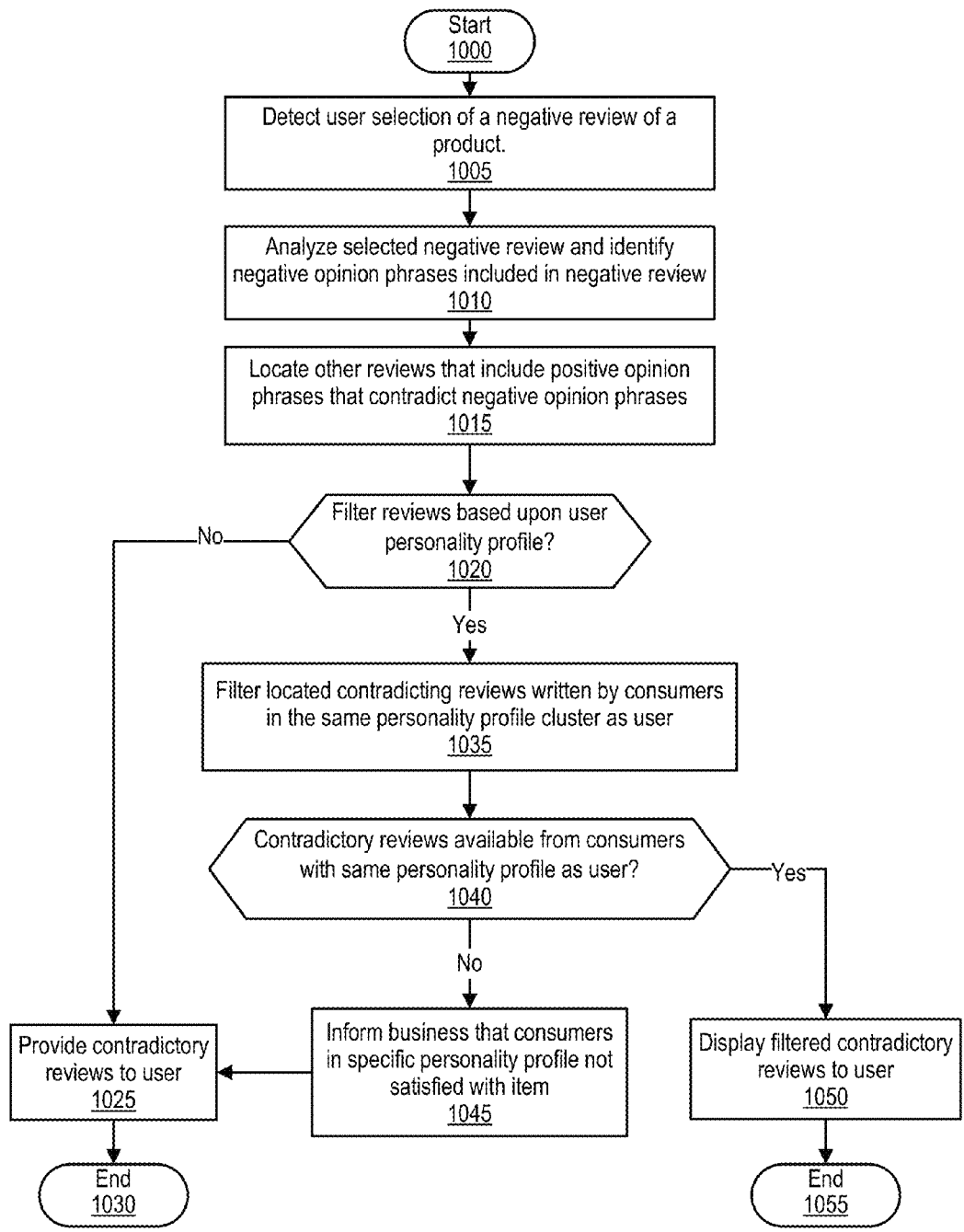
FIG. 10 is an exemplary flowchart depicting steps by a knowledge manager to analyze a negative review being viewed by a user and displaying contradicting positive reviews.

FIG. 10 is an exemplary flowchart depicting steps by a knowledge manager to analyze a negative review under review by a user and displaying contradicting positive reviews. Processing commences at 1000, whereupon the process detects a user selection of a negative review of an item at step 1005. In one embodiment, the process initially determines whether a review is a negative review based upon an overall rating (star rating).

At step 1010, the process analyzes the selected negative review and identifies negative opinion phrases included in the negative review. In one embodiment, the process may identify negative opinion phrases that are included in positive reviews, such as "the product quality is great but it arrived three days late." At step 1015, the process locates previous reviews that include positive opinion phrases that contradict negative opinion phrases. The positive opinion phrases may specifically contradict the negative opinion phrases (the chicken was good) or may generally contradict the negative opinion phrase (the food was good). In one embodiment, the process identifies concepts in the negative opinion phrases to find contradictory positive opinion phrases. For example, the negative opinion phrase "chicken was dry" references the concept of food, so the process identifies positive opinion phrases referencing the concept of food such as "the food was delicious."

The process determines as to whether to filter the contradictory reviews based upon the user's personality profile (decision 1020). For example, if the user has an "openness" personality profile, the user may configure the process to display previous reviews written by other users with an "openness" personality profile at the top of the list. If the process should not filter the contradictory reviews based upon user personality profile, then decision 1020 branches to the 'no' branch, whereupon, at step 1025, the process provides the contradictory reviews to user and FIG. 10 processing thereafter ends at 1030.

On the other hand, if the process should filter the reviews based upon the user's personality profile, then decision 1020 branches to the 'yes' branch. At step 1035, the process filters the contradicting reviews by selecting the reviews written by consumers from the same personality profile cluster as the user (see FIG. 5 and corresponding text for further details). The process determines as to whether there are available contradictory reviews from other consumers with the same personality profile (decision 1040). If contradictory reviews are available, then decision 1040 branches to the 'yes' branch. At step 1050, the process displays the filtered contradictory reviews to the user and FIG. 10 processing thereafter ends at 1055.

On the other hand, if no contradictory reviews are available, then decision 1040 branches to the 'no' branch. At step 1045, the process, in one embodiment, informs the business that consumers in the specific personality profile are not satisfied with the business' product or service. The process, in turn, provides the contradictory reviews from consumers with other personality profiles to the user at step 1025 and processing thereafter returns at 1030.

FIG. 11 is an exemplary flowchart depicting steps by a knowledge manager to provide item reviews to a user based upon the user's importance factors. Processing commences at 1100, whereupon the process receives a user request for reviews of an item at step 1110. At step 1120, the process retrieves the user's importance factors from the user's profile. At step 1130, the process retrieves previous item reviews from consumers that include phrases corresponding to the user's importance factors (e.g., delivery information, restaurant ambience, etc.).

The process determines as to whether to filter the reviews based upon the user personality profile (decision 1140). If the process should filter the previous reviews based upon the user's personality profile (e.g., via user configuration), then decision 1140 branches to the 'yes' branch. At step 1150, the process filters the reviews to include reviews written by consumers from the same personality profile cluster. On the other hand, if the process should not filter the reviews based upon user personality profiles, then decision 1140 branches to the 'no' branch bypassing step 1150.

The process determines as to whether to display a subset of the reviews, such as just positive reviews or just negative reviews (decision 1160). If the process should display a subset of the reviews, then decision 1160 branches to the 'yes' branch, whereupon, at step 1180, the process displays the positive or negative reviews based on user selection or user preference. FIG. 11 processing thereafter ends at 1185.

On the other hand, if the process should display both the positive reviews and the negative reviews, then decision 1160 branches to the 'no' branch. At step 1170, the process displays both the positive reviews and the negative reviews, and FIG. 11 processing thereafter ends at 1175.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   identifying, by the processor, one or more first opinion phrases included in a first review of an item, wherein the first review is displayed on a display to a user;
   locating one or more second reviews of the item that include one or more second opinion phrases that contradict at least one of the first opinion phrases;
   displaying the one or more second reviews on the display;
   determining a personality profile of the user based upon analyzing one or more user reviews that were written by the user; and
   notifying a producer corresponding to the item in response to determining that none of the one or more second reviews were written by one or more consumers having the same personality profile as the user.

2. The method of claim 1 further comprising:
   wherein the analyzing results in one or more identified personality traits of the user;
   determining the personality profile of the user based upon the one or more identified personality traits; and
   filtering the one or more second reviews based upon the personality profile of the user.

3. The method of claim 2 wherein the personality profile is selected from the group consisting of an openness profile, a conscientiousness profile, an extraversion profile, an agreeableness profile, and a neuroticism profile.

4. The method of claim 1 wherein the one or more first opinion phrases include a first negative opinion phrase and a second negative opinion phrase, the method further comprising:
   identifying one of the one or more second reviews that includes a first positive opinion phrase contradicting the first negative opinion phrase, the first positive opinion phrases included in the one or more second opinion phrases;
   identifying a different one of the one or more second reviews that includes a second positive opinion phrase contradicting the second negative opinion phrase, the second positive opinion phrases included in the one or more second opinion phrases; and
   displaying both the identified second review and the different second review.

5. The method of claim 1 wherein, prior to displaying the first review on the display, the method further comprises:
   receiving a user selection from the user that selects the first review; and
   displaying the first review and the one or more second reviews on the display in response to receiving the user selection.

6. An information handling system comprising:
   one or more processors;
   a memory coupled to at least one of the processors; and
   a set of computer program instructions stored in the memory and executed by at least one of the processors in order to perform actions of:
     identifying, by the processor, one or more first opinion phrases included in a first review of an item, wherein the first review is displayed on a display to a user;
     locating one or more second reviews of the item that include one or more second opinion phrases that contradict at least one of the first opinion phrases;
     displaying the one or more second reviews on the display;
     determining a personality profile of the user based upon analyzing one or more user reviews that were written by the user; and
     notifying a producer corresponding to the item in response to determining that none of the one or more second reviews were written by one or more consumers having the same personality profile as the user.

7. The information handling system of claim 6 wherein the one or more processors perform additional actions comprising:
wherein the analyzing results in one or more identified personality traits of the user;
determining the personality profile of the user based upon the one or more identified personality traits.

8. The information handling system of claim 7 wherein the personality profile is selected from the group consisting of an openness profile, a conscientiousness profile, an extraversion profile, an agreeableness profile, and a neuroticism profile.

9. The information handling system of claim 6 wherein the one or more first opinion phrases include a first negative opinion phrase and a second negative opinion phrase, and wherein the one or more processors perform additional actions comprising:
identifying one of the one or more second reviews that includes a first positive opinion phrase contradicting the first negative opinion phrase, the first positive opinion phrases included in the one or more second opinion phrases;
identifying a different one of the one or more second reviews that includes a second positive opinion phrase contradicting the second negative opinion phrase, the second positive opinion phrases included in the one or more second opinion phrases; and
displaying both the identified second review and the different second review.

10. The information handling system of claim 6 wherein, prior to displaying the first review on the display, the one or more processors performing additional actions comprising:
receiving a user selection from a user that selects the first review; and
displaying the first review and the one or more second reviews on the display in response to receiving the user selection.

11. A computer program product stored in a computer readable storage medium, comprising computer program code that, when executed by an information handling system, causes the information handling system to perform actions comprising:
identifying, by the processor, one or more first opinion phrases included in a first review of an item, wherein the first review is displayed on a display to a user;
locating one or more second reviews of the item that include one or more second opinion phrases that contradict at least one of the first opinion phrases;
displaying the one or more second reviews on the display;
determining a personality profile of the user based upon analyzing one or more user reviews that were written by the user; and
notifying a producer corresponding to the item in response to determining that none of the one or more second reviews were written by one or more consumers having the same personality profile as the user.

12. The computer program product of claim 11 wherein the information handling system performs additional actions comprising
wherein the analyzing results in one or more identified personality traits of the user;
determining the personality profile of the user based upon the one or more identified personality traits; and
filtering the one or more second reviews based upon the personality profile of the user.

13. The computer program product of claim 11 wherein the one or more first opinion phrases include a first negative opinion phrase and a second negative opinion phrase, and wherein the information handling system performs additional actions comprising:
identifying one of the one or more second reviews that includes a first positive opinion phrase contradicting the first negative opinion phrase, the first positive opinion phrases included in the one or more second opinion phrases;
identifying a different one of the one or more second reviews that includes a second positive opinion phrase contradicting the second negative opinion phrase, the second positive opinion phrases included in the one or more second opinion phrases; and
displaying both the identified second review and the different second review.

14. The computer program product of claim 11 wherein, prior to displaying the first review on the display, the information handling system performing additional actions comprising:
receiving a user selection from a user that selects the first review; and
displaying the first review and the one or more second reviews on the display in response to receiving the user selection.

* * * * *